United States Patent
Polly et al.

(10) Patent No.: US 8,954,927 B2
(45) Date of Patent: Feb. 10, 2015

(54) MANAGEMENT OF OBJECTS WITHIN A META-DATA REPOSITORY

(75) Inventors: Adam Polly, Stutensee (DE); Mathias Habich, Mannheim (DE)

(73) Assignee: SAP AG, Walldorf (DE)

( * ) Notice: Subject to any disclaimer, the term of this patent is extended or adjusted under 35 U.S.C. 154(b) by 565 days.

(21) Appl. No.: 12/982,270

(22) Filed: Dec. 30, 2010

(65) Prior Publication Data

US 2012/0174064 A1 Jul. 5, 2012

(51) Int. Cl.
*G06F 9/44* (2006.01)
*G06Q 10/10* (2012.01)

(52) U.S. Cl.
CPC .................................... *G06Q 10/10* (2013.01)
USPC ............................ 717/120; 717/106; 717/114

(58) Field of Classification Search
None
See application file for complete search history.

(56) References Cited

U.S. PATENT DOCUMENTS

| | | | | |
|---|---|---|---|---|
| 6,662,357 | B1* | 12/2003 | Bowman-Amuah | 717/120 |
| 6,789,252 | B1* | 9/2004 | Burke et al. | 717/100 |
| 7,735,062 | B2* | 6/2010 | de Seabra e Melo et al. | 717/120 |
| 7,788,238 | B2* | 8/2010 | Gabriel et al. | 717/168 |
| 7,949,684 | B2* | 5/2011 | Brooks et al. | 707/802 |
| 8,140,573 | B2* | 3/2012 | McKay et al. | 707/778 |
| 8,244,759 | B2* | 8/2012 | Brooks et al. | 707/782 |
| 8,499,005 | B2* | 7/2013 | Brooks et al. | 707/782 |
| 8,555,248 | B2* | 10/2013 | Brunswig et al. | 717/120 |
| 8,577,835 | B2* | 11/2013 | Doshi et al. | 707/608 |
| 8,635,232 | B2* | 1/2014 | Brooks et al. | 707/756 |
| 8,650,534 | B2* | 2/2014 | Kopp et al. | 717/114 |
| 2004/0177075 | A1* | 9/2004 | Rangadass | 707/10 |
| 2004/0215662 | A1* | 10/2004 | Rangadass | 707/104.1 |
| 2005/0066306 | A1* | 3/2005 | Diab | 717/108 |
| 2006/0101038 | A1* | 5/2006 | Gabriel et al. | 707/100 |
| 2006/0190927 | A1* | 8/2006 | Albahari et al. | 717/114 |
| 2007/0088741 | A1* | 4/2007 | Brooks et al. | 707/103 R |
| 2007/0168926 | A1* | 7/2007 | Rajah et al. | 717/106 |

(Continued)

OTHER PUBLICATIONS

Aulbach el al., Multi-tenant databases for software as a service: schema-mapping techniques, [Online] 2008, In Proceedings of the 2008 ACM SIGMOD international conference on Management of data ACM, [Retrieved from the Internet] <http://delivery.acm.org/10.1145/1380000/1376736/p1195-aulbach.pdf> 12 pages.*

(Continued)

*Primary Examiner* — Thuy Dao
*Assistant Examiner* — Ravi K Sinha
(74) *Attorney, Agent, or Firm* — Mintz Levin Cohn Ferris Glovsky and Popeo, P.C.

(57) ABSTRACT

At least one binary relationship defining an enhancement to a standard meta-object instance can be stored in a meta-data repository. The at least one binary relationship can be specified at design time and can define a dependency required to create an enhanced meta-object instance that includes the standard meta-object instance and the enhancement. The standard meta-object instance can be provided by a core software platform. The enhanced meta-object can include at least one additional feature relating to an external software component integrated into the core software platform. At run time, a request for a custom instance of a data structure based on the enhanced meta-object instance can be received. The custom instance can include a meta-object instance extension specified at design time by a service consumer of the core software platform. Also at run time, a transitive shell representing the custom instance of the data structure can be generated.

19 Claims, 6 Drawing Sheets

(56) References Cited

U.S. PATENT DOCUMENTS

| | | | | |
|---|---|---|---|---|
| 2007/0288891 | A1* | 12/2007 | Aakolk et al. | 717/114 |
| 2010/0077386 | A1* | 3/2010 | Akkiraju et al. | 717/136 |
| 2010/0318556 | A1* | 12/2010 | McKay et al. | 707/769 |
| 2011/0145787 | A1* | 6/2011 | Brunswig et al. | 717/120 |
| 2011/0289476 | A1* | 11/2011 | Pletter et al. | 717/107 |
| 2011/0289479 | A1* | 11/2011 | Pletter et al. | 717/122 |
| 2011/0296375 | A1* | 12/2011 | Mooney | 717/106 |
| 2012/0159435 | A1* | 6/2012 | Driesen et al. | 717/120 |
| 2012/0173589 | A1* | 7/2012 | Kwon et al. | 707/803 |
| 2014/0047412 | A1* | 2/2014 | Schlarb et al. | 717/106 |

OTHER PUBLICATIONS

Sun et al., Software as a Service: Configuration and Customization Perspectives, [Online] Sep. 2008, Congress on Services Part II, IEEE Sep. 23-26, 2008, [Retrieved from the Internet] <http://ieeexplore.ieee.org/stamp/stamp.jsp?tp=&arnumber=4700495> 7 pages.*

Azeez et al., Multi-tenant SOA Middleware for Cloud Computing, [Online] 2010, Cloud Computing (CLOUD), 2010 IEEE 3rd International Conference on, Jul. 5-10, 2010, [Retrieved from the Internet] <http://ieeexplore.ieee.org/stamp/stamp.jsp?tp=&arnumber=5557959> 8 pages.*

Ternier et al., The Ariadne Infrastructure for Managing and Storing Metadata, [Online] 2009, Internet Computing, IEEE, vol. 13, No. 4, pp. 18,25, Jul.-Aug. 2009, [Retrieved from the Internet] <http://ieeexplore.ieee.org/stamp/stamp.jsp?tp=&arnumber=5167264> 8 pages.*

Craig D. Weissman and Steve Bobrowski, The design of the force.com multitenant internet application development platform, [Online] 2009, In Proceedings of the 2009 ACM SIGMOD International Conference on Management of data, ACM, New York, NY, USA, [Retrieved from the Internet] <http://delivery.acm.org/10.1145/1560000/1559> pp. 889-896.*

* cited by examiner

MANAGEMENT OF OBJECTS WITHIN A META-DATA REPOSITORY

TECHNICAL FIELD

The subject matter described herein relates to management of meta-objects, for example meta-objects that can be dynamically enhanced by software components external to a core software platform and extended by a service consumer of the core software platform.

BACKGROUND

A business process or business method can be a collection of related, structured activities or tasks that produce a specific service or product, serve a particular goal for a particular customer or customers, or otherwise relate to operation of one or more functions of an organization. Business processes can be modeled, for example using one or more business objects based on metadata defined by one or more business applications.

In a typical business software system, metadata can be distributed into meta-object instances. For the purposes of this disclosure, metadata refers to data that characterizes other data, for example with regards to definition, structure, administration, and the like. Meta-objects are defined in a non-redundant manner and can be stored in a metadata repository. From a consumer perspective, a resulting view on a meta-object instance can be composed from several different meta-object instances, which can be characterized objects used to transfer data between software application components, subsystems, and system. Some examples of a resulting view on a metadata instance can include merging the metadata instance with one or many metadata extension instances (e.g. extensions added by service consumers), merging of metadata instance delta information in a business object projection with an underlying or standard business object template (e.g. to reflect dependencies between a dependent object and the standard business object template), including a reusable metadata instance part as a dependent object into one or several business objects to explicitly model that they share a common structure, and the like.

SUMMARY

In one aspect, a computer-implemented method includes storing, in a metadata repository, at least one binary relationship defining an enhancement to a standard meta-object instance. The at least one binary relationship, which is specified at design time, defines a dependency required to create an enhanced meta-object instance that includes the standard meta-object instance and the enhancement. The standard meta-object instance is provided by a core software platform. The enhanced meta-object includes at least one additional feature relating to an external software component integrated into the core software platform. At run time, a request for a custom instance of a data structure based on the enhanced meta-object instance is received. The custom instance includes a meta-object instance extension specified at design time by a service consumer of the core software platform. Also at run time, a transitive shell representing the custom instance of the data structure is generated at least by traversing the at least one binary relationship to create a template meta-object and applying the meta-object instance extension to the template meta-object to create a current version of the custom instance of the data structure. The transitive shell is then returned to the service consumer in response to the request.

In some variations one or more of the following can optionally be included. The custom instance of the data structure can include a business object projection based on a business object template incorporating functionality of at least one of the core software platform and the external software component, and the first binary relationship can specify a dependency relationship between a dependent object and the standard meta-object instance. The transitive shell can include at least one of information originally defined in the dependent object, information from the business object template, and information that is particular to the transitive shell. The service consumer can access the core software platform via a client tenant of a multi-tenant system comprising an application server providing access for each of a plurality of organizations to one of a plurality of client tenants, each of the plurality of client tenants that can include a customizable, organization-specific version of the core software platform that also integrates business functionality provided by at least the external software provider. The data repository can include core software platform content relating to the operation of the core software platform and that is common to all of the plurality of client tenants, system content having a system content format defined by the core software platform and containing system content data that are unique to specific client tenants of the plurality of client tenants, and at least one tenant-specific content item whose tenant-specific content format and tenant-specific content data are defined by and available to only one of the plurality of client tenants. The meta-object instance extension can include a definition of the tenant-specific content format. The enhancement can originate from an external software component external to the core software platform.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In a model of a business process, actions can be triggered on realized, concrete instances of objects. As an example, a custom invoice can be prepared from a customized template derived from a generic, original template (e.g. provided as a standard template with a business application) by adding one or more extensions to customize the functionality, fields, etc. of the invoice for a specific customer. The generic, original template can be provided as part of a core software platform that is capable of integrating functionality of one or more external software components. In a software architecture that integrates functionality of a number of software components that are not all under the control of a single development team or whose interdependencies are difficult or impossible to track unilaterally, maintaining current instances of extended metadata objects that are individually associated with different enhanced versions of the software architecture presents a number of challenges. Further complications can be added in a multi-tenant system as described below in which consumer-added extensions can be used to enhance an object from its global template form for specific use of the consumer.

Figure 1:
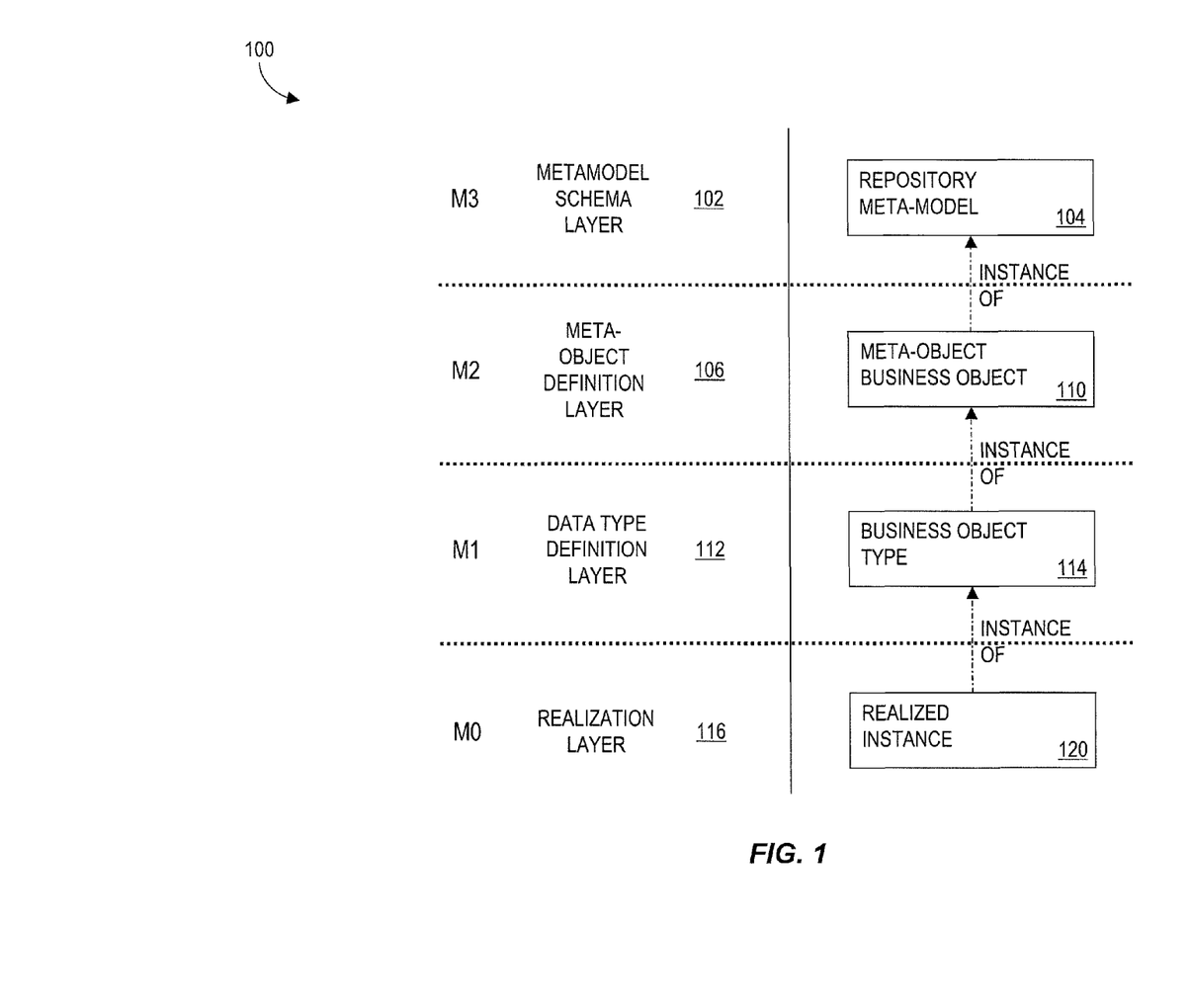
FIG. 1 is a diagram showing a layer structure for business objects, which are an illustrative example of a meta-object.

FIG. 1 shows a diagram of an exemplary layer structure 100 of an object model according to implementations of the current subject matter. The layer structure 100 can include an M3 layer 102 providing a meta-model schema and including a repository meta-model 104, and an M2 layer 106 that constitutes a meta-object layer providing a schema for types of meta-objects, such as for example data type meta-objects, business object meta-objects, service interface meta-objects, process agent meta-objects, and the like. The example layer structure 100 in FIG. 1 depicts a business object meta-object 110 defined in the M2 layer 106. An M1 layer 112 contains projections or templates, such as specific types or projections of business objects 114 in the example of FIG. 1. A business object template can be provided by a core software platform. A business object projection can include modifications to the business subject template, for example due to enhancements added by one or more external software components and/or extensions added by a consumer, such as for example by a key user of a tenant of a multi-tenant system. The M0 layer 116 contains realized instances 120 of the templates or projections defined in the M1 layer 112. For example, if the business object type 114 is a sales order business object template, the M0 layer can include individual realized instances of sales orders based on the template 114 and containing data specific to a given sale represented by that sales order realized instance. A customer or other service consumer of the core software platform can add one or more extensions to a standard projection or template 114 to create a custom instance of the projection or template 114. In one illustrative example, a business object meta-object can incorporate concepts such as templates or projections and dependent objects as discussed in greater detail in the illustrative examples provided herein. A calculation of a transitive shell can be performed on the M1 level 112. A sales order business object 114 can be a projection of a customer transaction document template defined in the M1 layer 112. With a sales order business object, enhancements and/or extensions such as dependent objects, attachment folder, payment control, and price and text calculation can be used. A sales order business object can also define parameters such as country, third party software provider partner, customer-specific extensions, and the like.

In an illustrative implementation of the current subject matter, a business object, which is an instance of a business object, can be defined as a business object projection of (e.g. an instance based on) a business object template, which can embed a dependent object. The dependent object can be configured to include a business object extension. The business object projection includes a resulting view, which can include information of one or more types including, but not limited to, information originally defined in the dependent object, information from the business object template, and information that is particular to the transitive shell. Information coming from the embedded dependent object and the underlying business object template can be of transitive nature with regard to the business object projection. Some business objects are self contained while others, such as for example business object projections, depend on other business objects required to calculate the resulting structure or transitive shell.

The business object projection can be configured to overrule values in transient instances that are based the business object template. In that case, a persistent instance within the business object projection can be created with delta information. The delta information needs to be determined when the object is saved and also needs to be properly merged with the transient information coming from underlying business objects.

To address these and potentially other issues with currently available solutions, one or more implementations of the current subject matter provide methods, systems, articles or manufacture, and the like that can, among other possible advantages, provide runtime views of a meta-object transitive shell. A generic approach is provided to handle arbitrary combinations of dependent object inclusions, extensions, business object templates, business object projections, and the like and the dependencies arising therebetween. The resultant runtime views can represent a current, dynamic version of an underlying projection, template, or the like that reflects binary relationships between the underlying projection, template, or the like and enhancements or extensions that may be transient.

Figure 2:
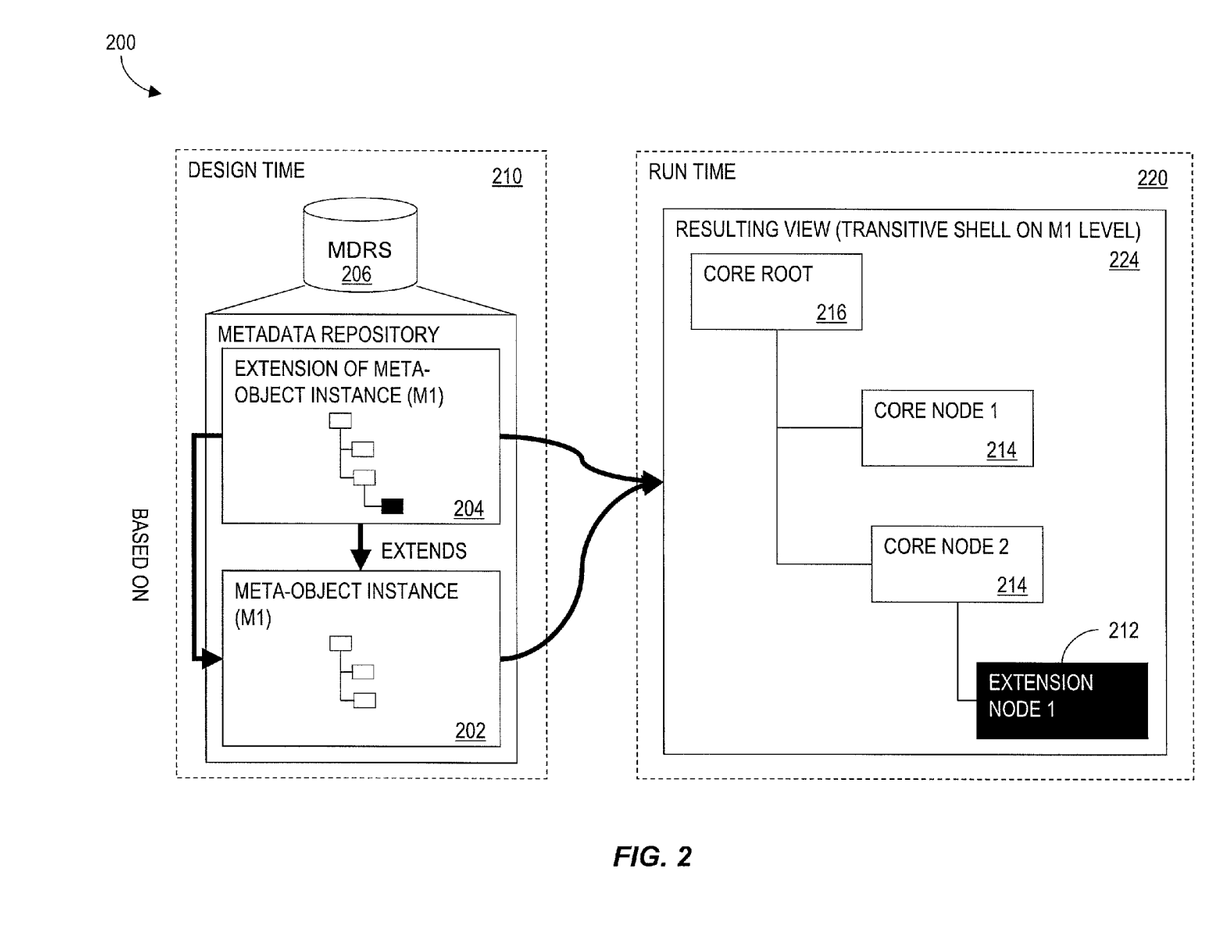
FIG. 2 is a diagram showing an example of a meta-object instance extension.

FIG. 2 shows a diagram 200 illustrating how a standard meta-object instance 202 can be extended via one or more extension classes 204 defined in a metadata repository 206 at design time 210. An extension class can, for example, include an extension node 212 that is to be added to a core node 214 of the standard meta-object instance 202 that also includes a core root node 216. At run time 220, a resulting view of the transitive shell of the extended meta-object instance 222 can be dynamically generated for presentation to a user. The dynamic generation can occur according to one of more mechanisms as discussed herein.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 3:
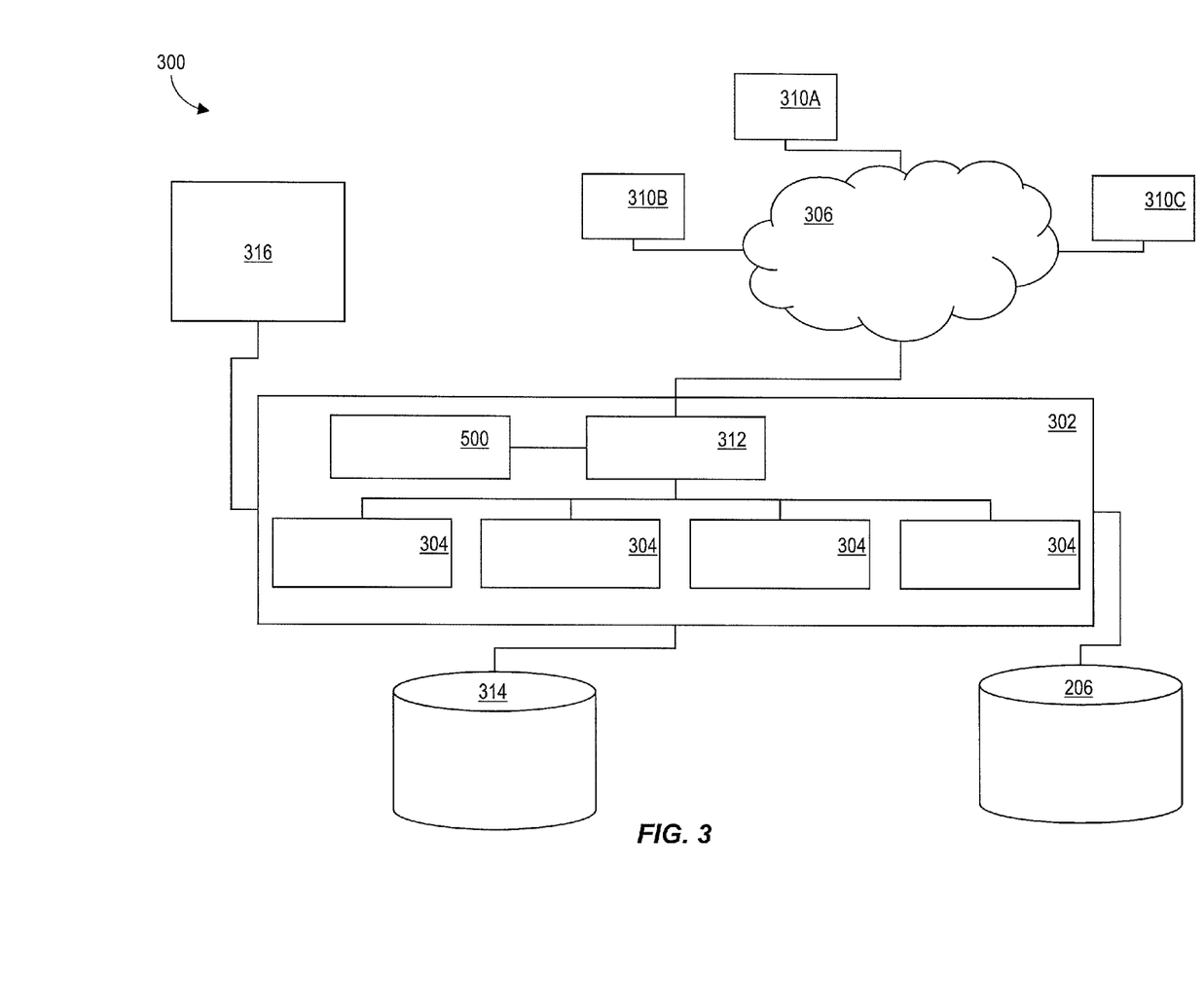
FIG. 3 is a diagram showing an example of a multi-tenant approach to providing customized software services to multiple organizations from a single architecture.

FIG. 3 shows a block diagram of a multi-tenant implementation of a software delivery architecture 300 that includes an application server 302, which can in some implementations include multiple server systems 304 that are accessible over a network 306 from client machines operated by users at each of multiple organizations 310A-310C (referred to herein as "tenant users" of a multi-tenant system) supported by a single software delivery architecture 300. For a system in which the application server 302 includes multiple server systems 304, the application server can include a load balancer 312 to distribute requests and actions from tenant users at the one or more organizations 310A-310C to the one or more server systems 304. A user can access the software delivery architecture across the network using a thin client, such as for example a web browser or the like, or other portal software running on a client machine. The application server 302 can access data and data objects stored in one or more data repositories 314. The application server 302 can serve as a middleware component via which access is provided to one or more external software components 316 that can be provided by third party developers. One or more metadata repositories 206 can store metadata including, but not limited to, standard meta-object instances defined by the core software platform and the one or more external software components 316 and extensions to meta-object instances defined by an organization 310A-310C within its corresponding tenant.

Figure 4:
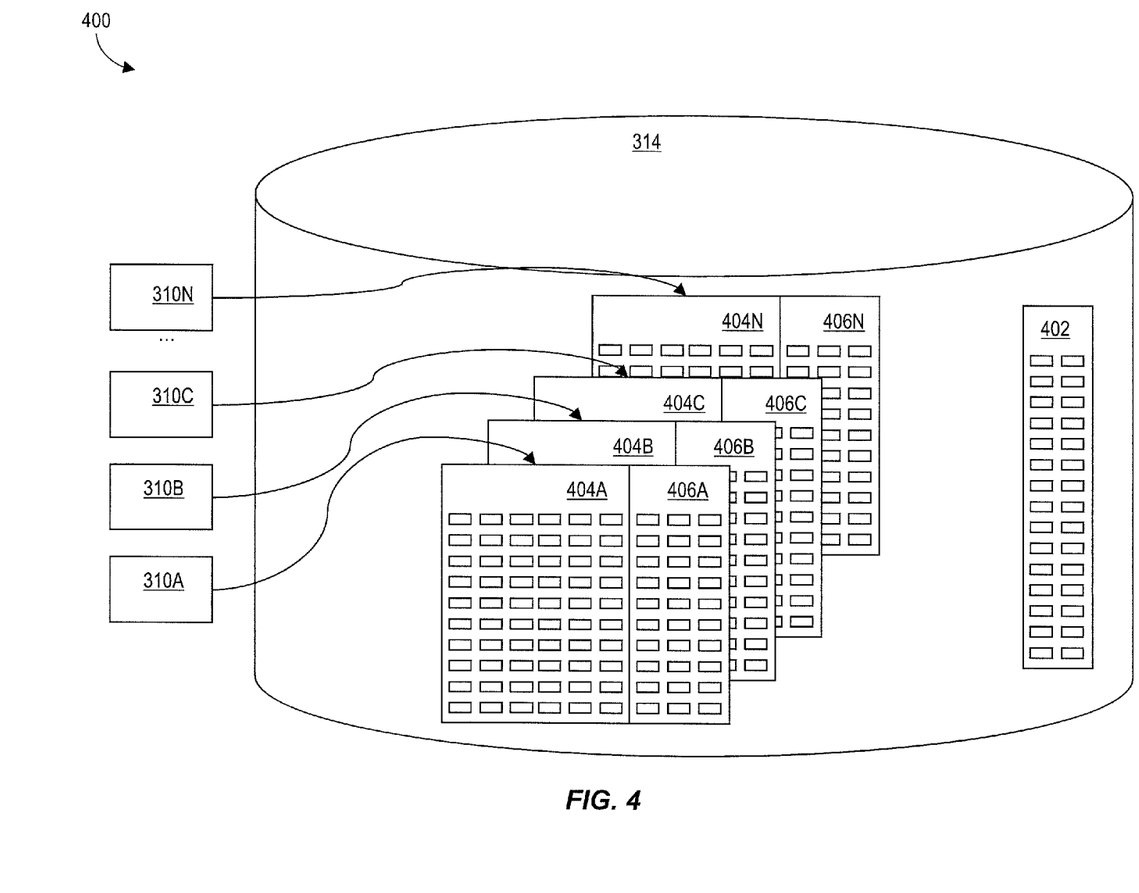
FIG. 4 is a diagram showing storage of both core software package data objects and tenant-specific data objects for each of multiple tenants of a multi-tenant system.

To provide for customization of the core software platform for tenant users at each of multiple organizations 310A-310C supported by a single software delivery architecture 300, the data and data objects stored in the repository or repositories 314 that are accessed by the application server 402 can include three types of content as shown in FIG. 4: core software platform content 402, system content 404, and tenant content 406. Core software platform content 402 includes content that represents core functionality and is not modifiable by tenant users. System content 404 can in some examples be created by the runtime of the core software platform and can include core data objects that are modifiable with data provided to tenant users at each organization 310A-310N. For example, if the core software platform is an ERP system that includes inventory tracking functionality, the system content 404A-404N can include data objects for labeling and quantifying inventory. The data retained in these data objects are tenant-specific: for example, data in the repository that are isolated to tenant users or each organization 310A-310N includes information about its own inventory. Tenant content 406A-406N includes data objects or extensions to other data objects that are customized for tenant users of one specific organization 310A-310N to reflect business processes and data that are specific to that specific organization's tenant users and are accessible only to authorized tenant users at the corresponding organization. Such data objects can include a key field (for example "client" in the case of inventory tracking) as well as one or more of master data, business configuration information, transaction data or the like. For example, tenant content 406 can include condition records in generated condition tables, access sequences, price calculation results, or any other tenant-specific values. A combination of the software platform content 402 and system content 404 and tenant content 406 of a specific organization are presented to the appropriate tenant such that each tenant provides access to a customized solution whose data are available only to tenant users from the corresponding organization.

In a multi-tenant architecture, a standard meta-object instance 202 within the M2 layer 106 can define a standard business object template within the M1 layer 112 that belongs to the core software platform layer. The one or more external software components 316 can define enhancements to the standard business object template, also in the M1 layer 112. To support globalization, for example the use of meta-object instances across multiple platforms (e.g. the core software platform, the one or more external software components 316, a plurality of tenants, etc.), support for meta-object instance layering is needed to provide specific, custom instances of a standard meta-object instance 202 to include all of the relevant extensions and enhancement for the target user. For example, to support extensions made at the root node 216 of the standard meta-object instance 202, objects from a template can be merged with extensions by the one or more external software components 316 and customers at one or more of the plurality of tenants.

In some implementations, a transitive shell can be calculated at run time 220, for example within the metadata repository 316 to show the effective structure of a meta-object instance independent of its clustering into distinct logical transport objects. This calculation is required if the content of a meta-object instance is requested because content is typically presented to a user independent of technical clustering, for example with regard to software logistics and development organizations. In other words, to present a seamless user experience while incorporating enhancements of one or more external software components 316 to a standard object provided by a core software platform and customization extensions added within an isolated tenant, the assembly of the transitive shell at run time 220 should occur invisibly to the end user.

Figure 5:
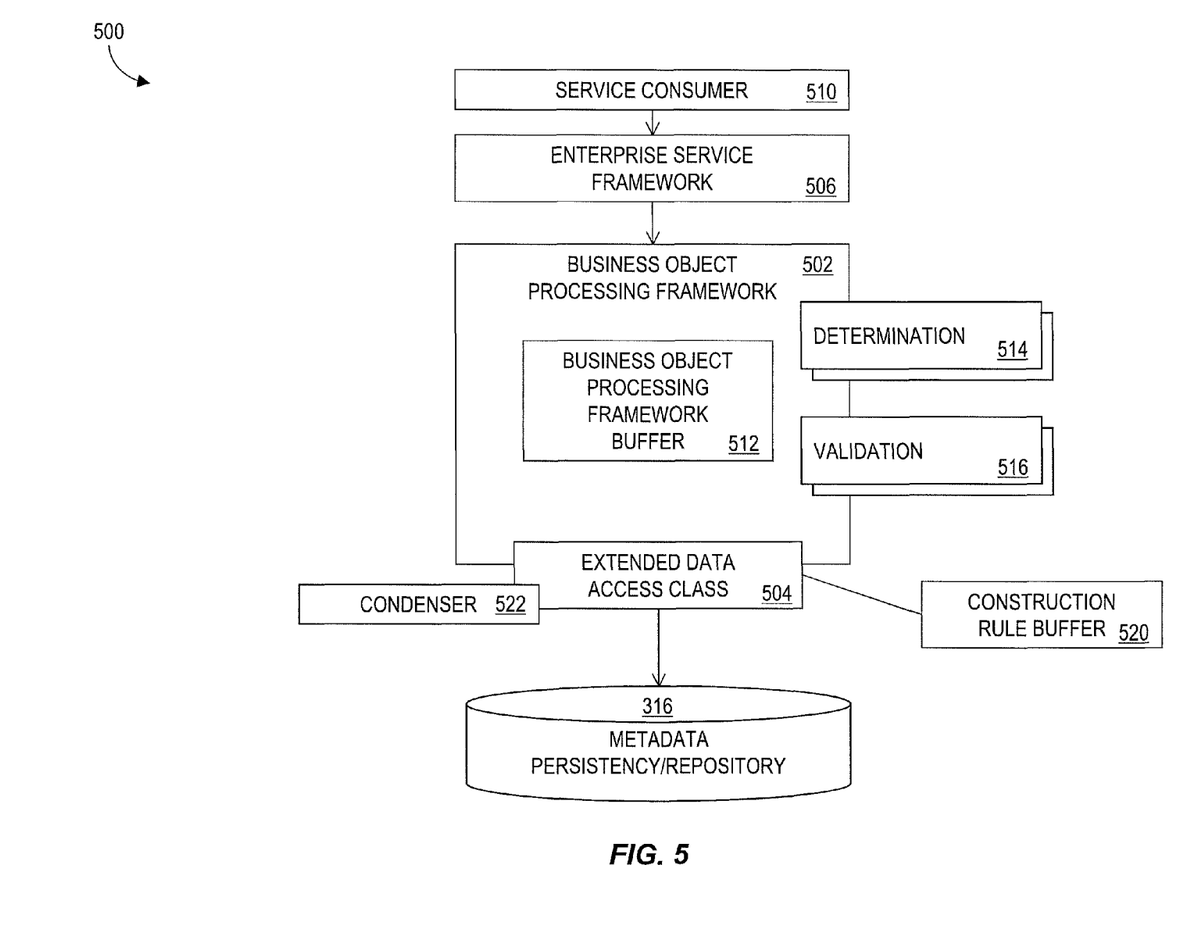
FIG. 5 is a diagram showing a system for managing objects within a metadata repository.

As shown in the diagram of a system architecture 500 in FIG. 5, a business process object framework (BOPF) 502 can be used to implement all metadata objects. The calculation of the transitive shell 224 and the management of the dependencies can fit into this architecture and support the interfaces and mass data oriented accesses used within the BOPF 502. The calculation of the transitive shell 224 and handling of the dependencies can be performed centrally, for example in a module, system, etc. referred to herein as an extended object access class 504. By managing transitive shells 224 centrally rather than at a tenant level, the logic working with the data can consume the resulting transitive shell 224 without affecting underlying structures, objects, associations, extensions, and the like that create the transitive shell 224.

Within the BOPF 502 and within an enterprise services framework (ESF) 506, the technical identifiers (e.g. a node identifier, a unique universal identifier, etc.) for a transient instance of the transitive shell 224 are kept stable within a single session. Across sessions, a transient instance can, and in many cases will, provide different values for its technical identifiers.

A meta-object can contain transient instances. The transitive shell of, for example a business object, can contain persistent instances defined in the business object itself, it can contain one or more instances that effectively "shine through" from a dependent object, an underlying template (if no delta information for the instance is available in the business object) or an extension. In the case of a "shining through" example, the instance 212 in the context of the transitive shell 224 is purely transient. For a transient instance 212, the underlying dependencies can be managed as binary relationships between a source instance and a target instance of the same type. Some examples of binary relationship types describing underlying dependencies between source and target instances can include inclusion of a dependent object into a hosting object (e.g. as a binary relationship from the host to the dependent object), a business object template based projection (e.g. as a binary relationship from the projection to the business object template), an extension to be resolved in an extended object (e.g. as a binary relationship from the extended business object to the business object extension), an association between business objects, and the like.

FIG. 5 illustrates components of an exemplary system 500 for calculating a transitive shell to present requested business object information to a consumer, according to some implementations of the current subject matter. As shown in FIG. 5, the enterprise service framework 506 can be accessed by a service consumer 510 for the purposes of obtaining information. The service consumer 510 can generate a query to the enterprise service framework 506, which can be configured to process the query to access various business objects, nodes, subnodes, extensions, projections and other objects that can be configured to contain information requested by the service consumer 510. The enterprise service framework 506 is communicatively coupled to the business object processing framework 502, which includes a business object processing framework buffer 512 and the extended data access class 504. The business object processing framework 502 can also include various determination 514 and validation 516 tools. The business object processing framework 502 can access a primary metadata persistency repository 316. A construction rule buffer 520 can be a logical extension of the business object processing framework buffer 502 that manages values of the instances of a business object. The construction rule buffer 520 can thereby manage dependencies of business objects between instances of business objects.

The extended data access class 504 can stole business object dependency in the construction rule buffer 520, which can manage the technical identifiers of transient instances and their mapping to alternative keys can be visible to the service consumer 510 during a session even if the same transient instance is reloaded/reconstructed multiple times in the same session. The construction rule buffer 520 can track for which instances the dependency graph has been resolved on the root level to avoid multiple resolution of the same dependency multiple times. This approach can lead to performance advantages.

Implementations of the current subject matter can handle various dependencies between business object instances, where data requested by the service consumer 510 can be located and/or obtained from a variety of arbitrary combinations of dependent object inclusion(s), extension(s), business object template(s) and/or business object projection(s). The transitive shell can be calculated by traversing the dependency relationships including extension nodes in a similar way as nodes coming from dependent objects or template business objects. The transitive shell 224 can be calculated in the data access class 504 to the metadata repository 316. Access to the business object processing framework buffer 512 will typically occur at a higher rate that access to the metadata repository 316 as already calculated data are returned from the business object processing framework buffer 512. All existing determinations, validations, etc. that are included by a meta-object instance service provider can also operate on the resulting transitive shell 224 and thereby not be required to implement their own functionality to calculate the transitive shell.

The business object processing framework 502 can request business object data using various tools, including query, read data, read composition, read by attributes, write, and any other operations. In each case, upon obtaining the data, the transitive shell can be calculated. A brief description of each methodology is provided below. While the methodologies discussed below are intended to be illustrative of some features of the current subject matter, they are not intended to be, nor should they be interpreted as limiting of the scope of the current subject matter.

The query methodology can be configured to query selected data from a database based on various parameters entered by the user or otherwise used by the system. For example, the query methodology can be configured to access a specific database table that contains requested information as well as to check whether an instance on a root level depends on other instances of the same type, e.g., whether a business object includes a dependent object, whether the object is a projection of a template, whether a meta-object instance has an extensions, etc. If the meta-object instance includes a dependency, then such dependency can be stored as a binary relationship in the construction rule buffer 520.

In some implementations, the real data methodology can be configured to select an instance of a business object data based on at least one parameter entered by the user or supplied by the system. It can also be configured to determine whether the selected instance depends on other instances of business object data, whether directly or indirectly. If there is a dependency between the selected instance and other instances, the data from the other instances can be read from the metadata persistency or repository 316.

In some implementations, a condenser 522 can determine instances of data that correspond to the instances of data from the additional instances of data that are identified during the initial reading of data. The condenser 522 can also use a set and a sequence of relevant dependency associations to map additional instances to the target context and trigger merging of attributes of the instances corresponding to the sequence of relevant dependency associations. The condenser 522 can register each resulting instance with the dependency in the construction rule buffer 520 including keys in the target context.

The condenser 522 can receive original data for the set of keys and further additional data. Based on the received information, the condenser 522 can trigger a merge operation of the values of the additional source data with the data read with the set of keys. The condenser 522 can tag instances that it manipulates with special node categories as the operations on those instances can be restricted. Such instances can require a special handling procedure during the write operation. For example, the special handling can include filtering pure transient instances or delta determination and storing of the pure delta information.

The read composition operation can be configured to include a standard logic that can select child instances for a set of parent keys. It can also include a logic that can check whether the parent instance depends directly or indirectly on other instances. If it is determined that there is a dependency, child instances of the additional source parent keys can be read from the metadata repository/persistency layer 316. Original data of the direct child instances together with the child nodes of the additional source instances can be passed to the condenser 522, which can trigger the merge operation of the values of overlapping child instances (e.g. similarly to the read data operation) or adds/maps the additional child nodes. Similarly to the read data operation, the instances that have been manipulated in the merger and additional child instances can be tagged with special node categories to ensure proper handling in the construction rule buffer 520 and during the write operation.

The read by attributes operation can include a standard logic that can select an instance data requested via an alternative key. It can also include an additional logic for the alternative key operation that can carry semantic key attributes of a meta-object instance node and check whether the request can be answered directly or the construction rule buffer 520 should be accessed to obtain additional data sources (e.g., extension(s), dependent object(s) and template (s)/projection(s), etc.). If so, then data from the additional sources can be taken into account for selection.

Because the read by attributes operation can be called on any meta-object instance node directly, it is possible that instance dependencies for the node tree hierarchy itself have not been calculated yet. As such, the read by attributes operation can assure that the calculation of the instance dependencies starting on the respective node can be configured to include the complete node tree via the parent node association. After the calculation of the instance dependencies, the source data and the data of the additional sources can be passed to the condenser 522 that can trigger the merge operation of the values of the found instances. Similarly to the read data operation, during the read by attributes operation, the instances that have been manipulated during the merge operation and any additional child instances can be tagged with special node categories to ensure proper handling in the buffer and during the write operation.

In some implementations, the write operation can be configured to identify kinds of instance data that can be processed. The write operation can also be configured to distinguish "regular" instances from instances with dependencies. To do so, during the write operation, the node categories that have been assigned to perform read/read composition operations can be used. The write operation can perform filtering of the instances with dependencies and can filter out purely transient instances that cannot be changed. For instances that may overrule values from their source, a delta comparison can be performed done and only the delta information can be stored.

In some implementations, the gathering of the information concerning meta-object instances in the metadata repository can include determining an object dependency on a root level for a particular object. Upon such determination, match criteria can be returned that identifies corresponding instances if the meta-object instance does not contain a key definition for an instance type. Based on the determination, concrete attribute values of a source and a target instance can be merged.

Figure 6:
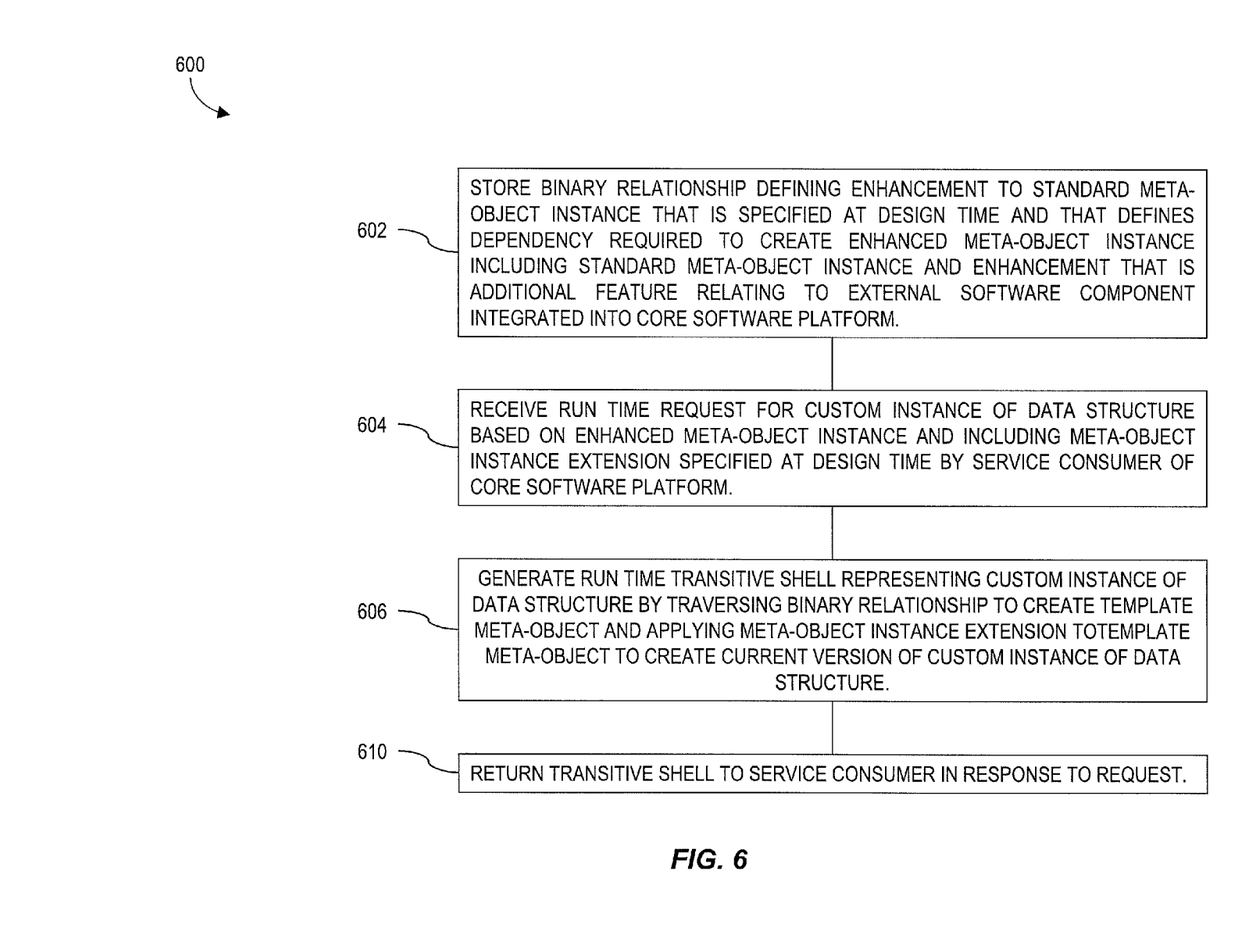
FIG. 6 is a process flow diagram showing features of a method.

FIG. 6 illustrates a method 600 according to some implementations of the current subject matter. At 602, at least one binary relationship defining an enhancement to a standard meta-object instance can be stored in a metadata repository. The at least one binary relationship can be specified at design time and can define a dependency required to create an enhanced meta-object instance that includes the standard meta-object instance and the enhancement. The standard meta-object instance can be provided by a core software platform. The enhanced meta-object can include at least one additional feature relating to an external software component integrated into the core software platform. At 604, a request for a custom instance of a data structure based on the enhanced meta-object instance can be received at run time. The custom instance can include a meta-object instance extension specified at design time by a service consumer of the core software platform. At 606, a transitive shell representing the custom instance of the data structure can be generated at run time. The generating can include traversing the at least one binary relationship to create a template meta-object and applying the meta-object instance extension to the template meta-object to create a current version of the custom instance of the data structure. At 610, the transitive shell can be returned to the service consumer in response to the request.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer implemented method comprising:
    storing, in a metadata repository, at least one binary relationship defining an enhancement to a standard meta-object instance, the at least one binary relationship being specified at design time and defining a dependency required to create an enhanced meta-object instance that includes the standard meta-object instance and the enhancement, the standard meta-object instance being provided by a core software platform, the enhanced meta-object comprising at least one additional feature relating to an external software component integrated into the core software platform, wherein the metadata repository comprises system content having a system content format defined by the core software platform and containing system content data that are unique to specific client tenants of a plurality of client tenants, and at least one tenant-specific content item whose tenant-specific content format and tenant-specific content data are defined by and available to only one of the plurality of client tenants;
    receiving, at run time, a request for a custom instance of a data structure based on the enhanced meta-object instance, the custom instance comprising a meta-object instance extension specified at design time by a service consumer of the core software platform, the service consumer accessing the core software platform via a client tenant of a multi-tenant system comprising an application server providing access for each of a plurality of organizations to one of the plurality of client tenants, each of the plurality of client tenants comprising a customizable, organization-specific version of the core software platform that also integrates business functionality provided by at least the external software provider;
    generating, at run time, a transitive shell representing the custom instance of the data structure, the generating comprising traversing the at least one binary relationship to create a template meta-object, and applying the meta-object instance extension to the template meta-object to create a current version of the custom instance of the data structure;
    returning the transitive shell to the service consumer in response to the request; and
    wherein the storing, receiving, generating and returning are performed by at least one system comprising computer hardware.

2. A computer implemented method as in claim 1, wherein the custom instance of the data structure comprises a business object projection based on a business object template incorporating functionality of at least one of the core software platform and the external software component, and wherein the first binary relationship specifies a dependency relationship between a dependent object and the standard meta-object instance.

3. A computer implemented method as in claim 2, wherein the transitive shell comprises at least one of information originally defined in the dependent object, information from the business object template, and information that is particular to the transitive shell.

4. A computer implemented method as in claim 1, wherein the metadata repository further comprises core software platform content relating to the operation of the core software platform and that is common to all of the plurality of client tenants.

5. A computer implemented method as in claim 1, wherein the meta-object instance extension comprises a definition of the tenant-specific content format.

6. A computer implemented method as in claim 1, wherein the enhancement originates from an external software component external to the core software platform.

7. A computer-implemented method as in claim 1, wherein the computer hardware comprises a programmable processor.

8. A computer program product comprising a non-transitory machine-readable medium storing instructions that, when executed by at least one programmable processor, cause the at least one programmable processor to perform operations comprising:
    storing, in a metadata repository, at least one binary relationship defining an enhancement to a standard meta-object instance, the at least one binary relationship being specified at design time and defining a dependency required to create an enhanced meta-object instance that includes the standard meta-object instance and the enhancement, the standard meta-object instance being provided by a core software platform, the enhanced meta-object comprising at least one additional feature relating to an external software component integrated into the core software platform, wherein the metadata repository comprises system content having a system content format defined by the core software platform and containing system content data that are unique to specific client tenants of a plurality of client tenants, and at least one tenant-specific content item whose tenant-specific content format and tenant-specific content data are defined by and available to only one of the plurality of client tenants;
    receiving, at run time, a request for a custom instance of a data structure based on the enhanced meta-object instance, the custom instance comprising a meta-object instance extension specified at design time by a service consumer of the core software platform, the service consumer accessing the core software platform via a client tenant of a multi-tenant system comprising an application server providing access for each of a plurality of organizations to one of the plurality of client tenants, each of the plurality of client tenants comprising a customizable, organization-specific version of the core software platform that also integrates business functionality provided by at least the external software provider;

generating, at run time, a transitive shell representing the custom instance of the data structure, the generating comprising traversing the at least one binary relationship to create a template meta-object, and applying the meta-object instance extension to the template meta-object to create a current version of the custom instance of the data structure; and returning the transitive shell to the service consumer in response to the request.

9. A computer program product as in claim 8, wherein the custom instance of the data structure comprises a business object projection based on a business object template incorporating functionality of at least one of the core software platform and the external software component, and wherein the first binary relationship specifies a dependency relationship between a dependent object and the standard meta-object instance.

10. A computer program product as in claim 9, wherein the transitive shell comprises at least one of information originally defined in the dependent object, information from the business object template, and information that is particular to the transitive shell.

11. A computer program product as in claim 8, wherein the metadata repository further comprises core software platform content relating to the operation of the core software platform that is common to all of the plurality of client tenants.

12. A computer program product as in claim 8, wherein the meta-object instance extension comprises a definition of the tenant-specific content format.

13. A computer-program product as in claim 8, wherein the enhancement originates from an external software component external to the core software platform.

14. A system comprising:
at least one programmable processor; and
a machine-readable medium storing instructions that, when executed by the at least one programmable processor, cause the at least one programmable processor to perform operations comprising:
storing, in a metadata repository, at least one binary relationship defining an enhancement to a standard meta-object instance, the at least one binary relationship being specified at design time and defining a dependency required to create an enhanced meta-object instance that includes the standard meta-object instance and the enhancement, the standard meta-object instance being provided by a core software platform, the enhanced meta-object comprising at least one additional feature relating to an external software component integrated into the core software platform, wherein the metadata repository comprises system content having a system content format defined by the core software platform and containing system content data that are unique to specific client tenants of a plurality of client tenants, and at least one tenant-specific content item whose tenant-specific content format and tenant-specific content data are defined by and available to only one of the plurality of client tenants;

receiving, at run time, a request for a custom instance of a data structure based on the enhanced meta-object instance, the custom instance comprising a meta-object instance extension specified at design time by a service consumer of the core software platform, the service consumer accessing the core software platform via a client tenant of a multi-tenant system comprising an application server providing access for each of a plurality of organizations to one of the plurality of client tenants, each of the plurality of client tenants comprising a customizable, organization-specific version of the core software platform that also integrates business functionality provided by at least the external software provider;

generating, at run time, a transitive shell representing the custom instance of the data structure, the generating comprising traversing the at least one binary relationship to create a template meta-object, and applying the meta-object instance extension to the template meta-object to create a current version of the custom instance of the data structure; and returning the transitive shell to the service consumer in response to the request.

15. A system as in claim 14, wherein the custom instance of the data structure comprises a business object projection based on a business object template incorporating functionality of at least one of the core software platform and the external software component, and wherein the first binary relationship specifies a dependency relationship between a dependent object and the standard meta-object instance.

16. A system as in claim 15, wherein the transitive shell comprises at least one of information originally defined in the dependent object, information from the business object template, and information that is particular to the transitive shell.

17. A system as in claim 14, wherein the metadata repository further comprises core software platform content relating to the operation of the core software platform and that is common to all of the plurality of client tenants.

18. A system as in claim 14, wherein the meta-object instance extension comprises a definition of the tenant-specific content format.

19. A system as in claim 14, wherein the enhancement originates from an external software component external to the core software platform.

* * * * *